J. Gibbons.
Turning Cotton Gin Rings.
N°. 78,954. Patented Jan. 16, 1868.
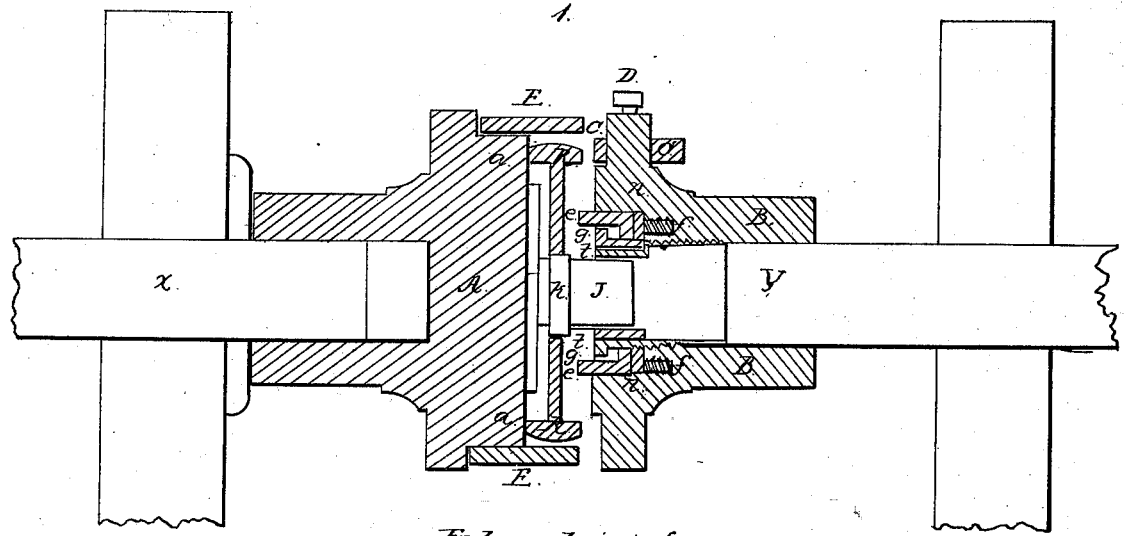
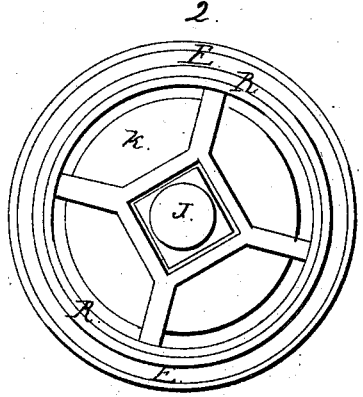
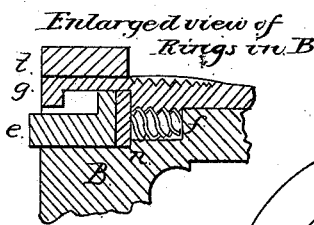
Enlarged view of Rings in B
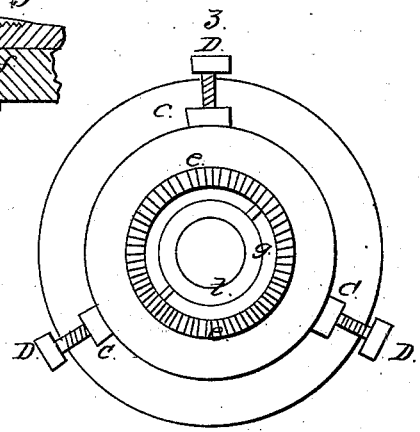
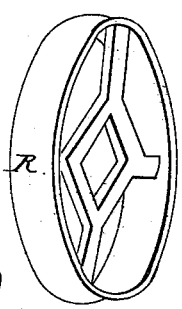
Witnesses. Inventor.
Rich'd Patrick DeWitt John Gibbons.
Dudley W. DeWitt

United States Patent Office.

JOHN GIBBONS, OF WEST TROY, NEW YORK.

Letters Patent No. 78,954, dated June 16, 1868.

IMPROVEMENT IN TOOL FOR TURNING CYLINDER-RINGS FOR COTTON-GINS.

*The Schedule referred to in these Letters Patent and making part of the same.*

Be it known that I, JOHN GIBBONS, of West Troy, Albany county, State of New York, have invented a Tool for use with Lathes for Facing or Turning the Edges of Cylinder-Rings for Cotton-Gins, or for analogous purposes; and I declare the following specification, with the drawings forming part thereof, to be a full and complete description of my invention.

Figure 1 represents the tool lengthwise, the front half as cut away, to show its interior construction, the light lines its connection with the apparatus of a lathe.

Figure 2 represents, in plan view, the revolving part of the tool, with a gin-cylinder ring in position.

Figure 3, in plan view, the non-revolving part of the tool, with its operating-apparatus.

Figure 4, in perspective, a gin-cylinder ring.

Similar letters denote the same parts of the apparatus.

The rings of cotton-gins are formed as shown in fig. 4, being fitted to and strung upon a square shaft, holding between them alternately the rings, into which are set the teeth which comb out the cotton, so that when secured against each other firmly, they form a strong cylinder.

In order to make these rings fit together, so as to complete the cylinder perfectly without secondary adjustments, it is requisite that the opposite edges $r\ r$ of the rings should be perfectly parallel with each other, and it is the intention of my invention to effect this purpose.

The tool for this purpose consists of two parts, the one a chuck, A A, being a cylindrical block, with a projecting face, $a\ a$, upon or against which the rings R to be faced are held during the facing-operation, in the manner shown in fig. 2, that is, by fitting upon a square arbor, $k$, so as to revolve with the chuck.

The other part of the tool is a cutter-head, being also a cylindrical block, B B, of similar diameter with A A. Through the periphery of the block, so as to be opposite to the ring R, cutters C project, held to their place, and adjusted for cutting by set-screws D.

The chuck A is secured in the usual manner upon the axis or arbor X of a lathe, by which it is revolved.

The cutter-head B slides, but does not revolve upon a rod, Y, attached to the standard of the lathe, and fitted to a bore, G, so as to be moved freely to and from the chuck; or, instead of the rod, it may be attached to a sliding standard of the lathe, in order to place and remove the ring R freely.

The depth to which the cutters are to operate is to be regulated by a gauge-ring, E, lying within a recess on the periphery of the block A; rings of different widths being employed for the various sizes of cylinder-rings, so as to vary the space between the inner faces of the blocks.

In order to hold the ring R steady against its bed $a\ a$, during the operation of the cutters, and to hold the cutters off from the ring, when not purposely pressed against it, a steel ring, $e\ e$, is sunk within a recess in the block B, the recess being sufficiently deep to allow a movement of the ring, of, say, three-quarters of an inch inwards and outwards within it. The ring is habitually kept outwards, by spiral springs $f\ f$, placed in small recesses behind it, the springs having sufficient power to hold the outer edge of the rings, (which is serrated for the purpose,) firmly against the axial arms of the ring. Necessarily, the ring $e\ e$ must revolve with the ring R, and in order to prevent this movement from deranging the springs, a thin metal ring, $n$, is interposed between them, upon which the base of the ring $e\ e$ slides.

To prevent the ring from slipping out from the recess, it has a slight flange or projection at its base, turning inwards, and the outer end of the recess is closed by a thin ring of metal, $g\ g$, which screws into the side of the bore G; the outer end of the ring $g\ g$ having a flange or projection outwards, so as to engage with the flange of ring $e\ e$.

Within the last-mentioned ring, another one, $t$, is driven in snugly. It is intended to support the thin ring $g\ g$, and to serve as the socket for a short axis, J, projecting from block A.

The method of operating the machine is thus: Block B is removed from block A far enough to permit the placing of the ring R upon or against the face $a\ a$, and the proper gauge-ring E in position, and the cutters C C adjusted to make the proper depth of cut.

The cutter-block B is now to be moved up, until the cutters act upon the edge of the ring, and have cut down to the depth permitted by the gauge-ring E.

The cutter-block is to be again withdrawn, the ring turned, so as to present its other edge to the cutters, and the process above described repeated, and so on, with any number of rings.

What I claim as my invention, and desire to secure by Letters Patent, is—

The chuck A, with its projecting face $a\ a$, and arbor $k$, and recess for gauge-rings, in combination with gauge-rings E, and with the cutter-head B, its cutter C, ring $e$, its recess, supporting-rings $n$, and spiral springs $f\ f$, and rings $g$ and $t$, substantially as described, and for the purposes set forth.

JOHN GIBBONS.

Witnesses:
    Rich'd Varick De Witt,
    Dudley W. De Witt.